United States Patent [19]

Grünbauer et al.

[11] Patent Number: 4,943,597

[45] Date of Patent: Jul. 24, 1990

[54] POLYETHER POLYOL FORMULATIONS FOR HARD CFC REPLACEMENT BY WATER BLOWING IN RIGID POLYURETHANE FOAMS

[75] Inventors: Henri J. M. Grünbauer, Oostburg, Sweden; Johan A. Thoen, Dommerstraat, Netherlands; Guido F. Smits, Wijnegem, Belgium

[73] Assignee: The Dow Chemical Company, Midland, Mich.

[21] Appl. No.: 280,860

[22] Filed: Dec. 7, 1988

[51] Int. Cl.$^5$ .................. C08G 18/14; C08G 18/48
[52] U.S. Cl. .................. 521/167; 521/174; 521/175; 521/177
[58] Field of Search ............ 521/167, 174, 175, 177

[56] References Cited

U.S. PATENT DOCUMENTS 3,865,806  2/1975  Knodel .
3,965,052  6/1976  Iwasaki .
4,273,882  6/1981  Raynor .

Primary Examiner—Maurice J. Welsh
Assistant Examiner—Rabon Sergent

[57] ABSTRACT

Rigid closed-cell polyisocyanate-based foams are prepared by the reaction of polyisocyanate with a polyol composition having an average hydroxyl number of about 100 to about 500 and comprising at least one polyether polyol containing four or more active hydrogens and having a hydroxyl number of from about 50 to about 500. The blowing of the foam is essentially with carbon dioxide generated from the reaction of water with polyisocyanate so as to provide foams of the desired density containing at least 40 mole percent carbon dioxide in their cells.

14 Claims, No Drawings

POLYETHER POLYOL FORMULATIONS FOR HARD CFC REPLACEMENT BY WATER BLOWING IN RIGID POLYURETHANE FOAMS

BACKGROUND OF THE INVENTION

This invention relates to the preparation of rigid closed-cell polyisocyanate-based foams, particularly polyurethane or polyurethane-modified polyiscyanurate foams where the use of hard CFC blowing agents is minimized or eliminated.

It is well-known to prepare foamed, closed-cell materials by the reaction of polyisocyanates with active hydrogen-containing materials in the presence of blowing agents. Typically these blowing agents are organic compounds which boil or decompose to give gaseous products at temperatures convenient for foam preparation. Especially useful in the preparation of rigid polyisocyanate-based foams are the halocarbon blowing agents, which, in addition to blowing, provide other physical properties, e.g., thermal insulation. The most commonly employed halocarbons are the Refrigerants R-11, R-12 and R-113, sometimes referred to as "hard" halocarbons.

The "hard" halocarbons are those in which all hydrogens of the alkane have been replaced by a halogen, normally fluorine or chlorine. These halocarbons, also called chlorofluorocarbons (CFC) are stable in the environment and are not degraded before reaching the upper strata of the atmosphere. At the upper stratum of the atmosphere, theoretically, they are thought to participate in, and change the free radical reactions and chemical equilibrium associated with the balance of the composition of the atmosphere, see "Ozone Studies in Antarctica" by J. Farman, *New Scientist*, p. 49 (Nov. 12, 1987). Accordingly, it is highly desirable to replace all hard blowing agents with alternative products which are not considered to change the composition and equilibriums of the upper atmosphere.

One possible means is to replace hard halocarbons with "soft" halocarbon blowing agents in the preparation of foams. Soft halocarbons are those which contain at least one hydrogen atom from the corresponding alkane in addition to the halogens, normally chlorine and fluorine. Such compounds are more readily degraded in the lower strata of the atmosphere and therefore significantly less reaches the upper strata of the atmosphere. Several "soft" CFCs exist which have boiling points and physical properties similar to the commonly used hard CFCs. The use of such blowing agents in the preparation of polyurethane foams has been discussed, see, for example, U.S. Pat. No. 4,636,529 and 4,076,644.

However, the use of soft CFCs in the preparation of polyurethane foam has been limited due to their restricted commercial availability and high pricing in comparison to the most commonly used hard CFCs.

An alternative means of replacing hard CFCs in the preparation of polyurethane foam is to use water. Water reacts with the isocyanate, generating carbon dioxide which then causes the reaction mixture to expand and attain a cellular structure. The use of water in the preparation of flexible polyurethane foams is well-established, where it comprises the major portion or all of the total blowing agent requirement. However, water has not successfully been used as the major or total portion of blowing agent in the preparation of rigid polyurethane foams. Frequently, when water is used at such levels, poor quality foams are obtained displaying a high degree of friability, low compressive strengths and high open-cell contents. In addition, the use of water has not until now been economically interesting due to the greatly increased consumption of costly isocyanate.

U.S. Pat. No. 4,273,882 teaches the preparation of polyurethane foams using water as the major portion of the blowing agent. The foams are prepared in the absence of catalyst and display a high open-cell content. U.S. Pat. No. 3,965,052 teaches a process for the preparation of low smoke-generating polyisocyanate foams. Polyols are reacted with at least three chemical equivalents of polyisocyanate in the presence of hard CFC and from two to six parts by weight water. Foams prepared with different quantities of water and less polyisocyanate are said to display poor rigidity, compressive strengths and shrink.

It is therefore desirable to provide a process for the preparation of rigid, closed-cell polyurethane foam or polyurea-modified polyurethane foam where water is used as the major portion of the blowing agent, thereby reducing or eliminating the need for hard chlorofluorocarbon blowing agents.

SUMMARY OF THE INVENTION

It has now been discovered that rigid, closed-cell polyurethane foams of good physical properties including low friability, good compressive strengths and dimensional stability can be prepared when the blowing agent comprises water and when the polyol composition reacting with the isocyanate is modified to comprise a high functionality, high molecular weight polyol.

In one aspect, this invention is a process for preparing a rigid closed-cell polyisocyanate-based polymer, having an average density of about 6 to about 150 kg/m$^3$, which comprises reacting a polyol composition with an organic polyisocyanate in the presence of a blowing agent containing water sufficient to provide at least 40 theoretical mole percent carbon dioxide in the cells of the resulting polymer said polyol composition comprising (a) at least 30 percent by total weight of said polyol composition a polyol having a hydroxyl member of about 50 to about 500 and an average functionality of at least 4 and being the product of reacting a carbohydrate or an aromatic initiator with an oxide; and (b) optionally one or more polyols, different from (a), having a hydroxyl number of about 50 to about 800 in not more than about 70 percent by weight cf the total weight of said polyol composition;

and wherein the average hydroxyl number of (a) and (b) is from about 100 to about 500, and said polyisocyanate is used in an amount so as to provide about 0.9 to 3.0 isocyanate groups per active hydrogen including water in the reacting system.

In another aspect, this invention is a closed-cell polyisocyanate-based foam prepared by the process of this invention.

Surprisingly, this invention provides for the use of polyether polyols which previously were not considered for the preparation of closed-cell rigid polyurethane foam due to their tendency to give poor quality foam properties such as poor compressive strengths and dimensional stability. Even more surprisingly the use of such polyols with essentially water as the blowing agent provides a rigid, closed-cell, polymer exhibiting good thermal and physical characteristics, excellent processing characteristics and greatly minimizes or eliminates the necessity to use "hard" CFC blowing agents.

DETAILED DESCRIPTION OF THE INVENTION

As described hereinabove, the polyol composition utilized in the process for preparing the rigid polyurethane foam in accordance with this invention comprises a high functionality, high equivalent weight polyol, which optionally in admixture with other polyols, catalysts, surfactant, blowing agent, additives, can be reacted with a polyisocyanate to give the product.

The high functionality, high molecular weight polyol is prepared by reacting a suitable initiator containing active hydrogens with alkylene oxide. Suitable initiators are those containing at least 4 active hydrogens or combinations of initiators where the mole average of active hydrogens is at least 4, preferably from about 4 to about 8, and more preferably from about 6 to about 8. Active hydrogens are defined as those hydrogens which are observed in the well-known Zerewitinoff test, see Kohler, *Journal of the American Chemical Society*, p. 3181, Vol. 49 (1927). Representative of such active hydrogen-containing groups include -OH, -COOH, -SH and -NHR where R is H or alkyl, aryl aromatic group and the like.

Examples of suitable initiators comprise pentaerythritol, carbohydrate compounds such as lactose, α-methylglucoside, α-hydroxyethylglucoside, hexitol, heptitol, sorbitol, dextrose, manitol, sucrose and the like. Examples of suitable aromatic initiators containing at least four active hydrogens include aromatic amines such as toluene diamine and methane diphenylamine, the reaction product of a phenol with formaldehyde, and the reaction product of a phenol with formaldehyde and a dialkanolamine such as described by U.S. Pat. Nos. 3,297,597; 4,137,265 and 4,383,102 (incorporated herein by reference). Other suitable initiators which may be used in combination with the initiators containing at least four active hydrogens include water, glycerine, trimethylolpropane, hexane triol, aminoethylpiperazine and the like. These initiators contain less than four active hydrogens and therefore can only be employed in quantities such that the total mole average of active hydrogens per molecule remains at least four or more. Particularly preferred initiators for the preparation of the high functionality, high molecular weight polyols comprise sucrose, dextrose, sorbitol, α-methylglucoside, α-hydroxyethylglucoside which may be employed separately or in combination with other initiators such as glycerine or water.

The polyols may be prepared by methods well-known in the art such as taught by Wurtz, *The Encyclopaedia of Chemical Technology*, Vol.7 p. 257-266, Interscience Publisher Inc. (1951) and U.S. Pat. No. 1,922,459. For example polyols can be prepared by reacting, in the presence of an oxyalkylation catalyst, the initiator with an alkylene oxide. A wide variety of oxyalkylation catalysts may be employed, if desired, to promote the reaction between the initiator and the alkylene oxide. Suitable catalysts include those described in U.S. Pat. Nos. 3,393,243 and 4,595,743 incorporated herein by reference. However, it is preferred to use as a catalyst a basic compound such as an alkali metal hydroxide, e.g., sodium or potassium hydroxide, or a tertiary amine such as trimethylamine.

The reaction is usually carried out at a temperature of about 60° C. to about 160° C., and is allowed to proceed using such a proportion of alkylene oxide to initiator so as to obtain a polyol having a hydroxyl number ranging from about 100 to about 500, preferably about 100 to about 400, more preferably from about 140 to about 340 and most preferably) from about 200 to about 340. The hydroxyl number range 100 to 500 corresponds to an equivalent weight range of about 112 to about 560.

Polyols of higher hydroxyl number than 500 when used in the process according to this invention give foams exhibiting brittleness and friability, and than of lower than 50 hydroxyl number give foams with poor compressive strengths.

The alkylene oxides which may be used in the preparation of the polyol include any compound having a cyclic ether group, preferably an α,β-oxirane, and is unsubstituted or alternatively substituted with inert groups which do not chemically react under the conditions encountered whilst preparing a polyol. Examples of suitable alkylene oxides include ethylene oxide, propylene oxide, 1,2- or 2,3-butylene oxide, the various isomers of hexane oxide, styrene oxide, epichlorohydrin, epoxychlorohexane, epoxychloropentane and the like. Most preferred, on the basis of performance, availability and cost are ethylene oxide, propylene oxide, butylene oxide and mixtures thereof, with ethylene oxide, propylene oxide, or mixtures thereof being most preferred. When polyols are prepared with combinations of alkylene oxides, the alkylene oxides may be reacted as a complete mixture providing a random distribution of oxyalkylene units within the oxide chain of the polyol or alternatively they may be reacted in a step-wise manner so as to provide a block distribution within the oxyalkylene chain of the polyol.

By way of example, but not limitation, such polyols that may be used in accordance with the process of this invention include a sucrose-initiated polyol propoxylated to an average hydroxyl number of about 180 to about 220, a sorbitol-initiated polyol propoxylated to an average hydroxyl number of about 250 to about 290, a sorbitol-glycerine initiated polyol having nominally an average of about 4.0 to about 4.4 active hydrogens and propoxylated to a hydroxyl number of about 250 to about 290.

The polyol composition contains the high functionality, high molecular weight polyol, component (a), in a quantity sufficient to allow the preparation of low friability, good dimensionally stable and strong foams. The high functionality, high molecular weight polyol comprises at least about 30 percent, more preferably at least about 50 percent and most preferably at least about 70 percent of the total weight of polyol composition. Optionally, the polyol composition may comprise one or more additional polyols, (component (b)), in not more than about 70 percent, preferably less than about 50 percent and most preferably less than about 30 percent by weight of the total weight of the polyol composition. When as optional component (b) polyol is present, this polyol is different from that of component (a).

The average hydroxyl number of the polyol composition comprising polyol components (a) and (b) advantageously is from about 100 to about 500, preferably about 140 to about 400, more preferably from about 140 to about 340 and most preferably from about 200 to about 340. Use of a polyol composition having an average hydroxyl number outside these limits leads either to foams with very low compressive strength or alternatively high friability.

Suitable additional polyols include polyether polyols, polyester polyols, polyhydroxy-terminated acetal resins, hydroxy-terminated amines and polyamines. Examples of these and other suitable materials are described more fully in U.S. Pat No. 4,394,491, particularly in columns 3 to 5 thereof. Most preferred for preparing rigid foams are those having nominally from about 2 to about 8, preferably from about 3 to about 8 active hydrogens and having a hydroxyl number from about 50 to about 800, preferably from about 50 to about 500, and more preferably from about 50 to about 250. Exemplary of such polyols include those commercially available under the product name Voranol TM and include polyols such as Voranol RN411, Voranol RN490, Voranol RA640, Voranol RA475, Voranol 260, Voranol 450, Voranol P1010 and Voranol CP 1055 sold by The Dow Chemical Company and other such like polyols.

In preparing foams by the process according to the invention, the above described polyol composition is reacted with an organic polyisocyanate. Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyl diisocyanate, diphenylmethane-4,4'-diisocyanate, diphenylmethane-2,4'-diisocyanate, 4,4'-biphenylene diisocyanate, 3,3'-dimethoxy-4,4'-biphenylene diisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5'5'-tetraisocyanate and the diverse polymethylenepolyphenylpolyisocyanates A crude polyisocyanate may also be used in making polyurethanes, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred for making rigid polyurethanes are methylene-bridged polyphenylpolyisocyanates, having an average functionality of about 2.05 to about 3.5, preferably about 2.4 to about 3.1 isocyanate moieties per molecule, due to their ability to cross-link the polyurethane. The isocyanate index (ratio of equivalents of isocyanates to equivalents of active hydrogen-containing groups) is advantageously from about 0.9 to about 3.0, preferably about 1.0 to about 2.0 and most preferably from about 1.0 to about 1.5.

In preparing rigid foam, a foaming or blowing agent is employed to confer a cellular structure to the polymer. Water is used to generate carbon dioxide by reaction with isocyanate to provide at least 40 mole percent, preferably at least about 50 to about 80 mole percent and more preferably at least about 50 to about 70 mole percent of the theoretical total cell-gas composition in the foams. For the purpose of this invention, the theoretical gas composition is calculated on the basis of the molar quantities of gases which are generated chemically or result from thermal decomposition or boiling of boiling agents. Optionally, other blowing agents may be used in addition to the water and include low boiling halocarbons, such as fluorocarbons and chlorofluorocarbons, finally divided solids such as pecan flour, the so-called "azo" blowing agents which liberate nitrogen and the like.

Exemplary of such other materials are the low boiling halogenated hydrocarbons including methylene chloride, trichlorofluoromethane, dichlorodifluoromethane, trichloroethane, and the ethane-derived chlorofluorocarbons Refrigerants R-123, R-141b, R-142b and the like. Generally, when water is employed, an amount is used ranging from about 0.1 to about 30, and more frequently about 1 to about 10 parts by weight per 100 parts of the polyol composition in the foam-forming reaction. Sufficient quantities of foaming agents are employed to provide foams having a density from about 6 to about 150, preferably about 6 to about 100 and more preferably about 15 to about 60 $Kg/M^3$.

Other components useful in producing polyurethanes include surfactants, pigments, colorants, fillers, anti-oxidants, flame retardants, stabilizers and the like.

When preparing polyisocyanate-based foams, it is generally advantageous to employ a minor amount of a surfactant to stabilize the foaming reaction mixture until it obtains rigidity. Such surfactants advantageously comprise a liquid or solid organosilicon compound. Other, less preferred surfactants include polyethylene glycol ethers of long chain alcohols, tertiary amine or alkanolamine salts of long chain alkyl acid sulfate esters, alkylsulfonic esters, alkylarylsulfonic acids. Such surfactants are employed in amounts sufficient to stabilize the foaming reaction mixture against collapse and the formation of large, and uneven cells. Typically, about 0.2 to about 5.0 parts of the surfactant per 100 parts per weight polyol composition are sufficient for this purpose.

One or more catalysts for the reaction of the polyol and water with the polyisocyanate are advantageously used. Any suitable urethane catalyst may be used including tertiary amine compounds and organometallic compounds.

One or more catalysts for the reaction of the polyol with the polyisocyanate are advantageously used. Any suitable urethane catalyst may be used, including tertiary amine compounds and organometallic compounds. Exemplary tertiary amine compounds include triethylenediamine, N-methylmorpholine, pentamethyldiethylenetriamine, dimethylcyclohexylamine, tetramethylethylenediamine, 1-methyl-4-dimethylaminoethyl-piperazine, 3-methoxy-N-dimethylpropylamine, N-ethylmorpholine, diethylethanolamine, N-cocomorpholine, N,N-dimethyl-N',N'-dimethylisopropyl-propylenediamine, N,N-diethyl-3-diethylaminopropylamine, dimethylbenzylamine and the like. Exemplary organometallic catalysts include organomercury, organolead, orgaoferric and organotin catalysts, with organotin catalysts being preferred among these. Suitable organotin catalysts include tin salts of carboxylic acids such as dibutyltin di-2-ethyl hexanoate, as well as other organometallic compounds such as are disclosed in U.S. Pat. No. 2,846,408. Metal salts such as stannous chloride can also function as catalysts for the urethane reaction. A catalyst for the trimerization of polyisocyanates, such as an alkali metal alkoxide or carboxylate, may also optionally be employed herein. Such catalysts are used in an amount which measurably increases the rate of reaction of the polyisocyanate. Typical amounts are about 0.01 to about 1 part of catalyst per 100 parts by weight of polyol.

The components described may be employed to produce rigid polyurethane and polyurethane-modified isocyanurate foam. The polyol composition comprising the high equivalent weight, high functionality polyol is reacted with an organic polyisocyanate in the presence of blowing agent, catalyst, surfactant, additives, fillers, etc. The rigid foams prepared here may be made in a one-step process by reacting all the ingredients together at once, or foams can be made by the so-called "quasi-prepolymer method." In the one-shot process where foaming is carried out in machines, the active hydrogen-containing compounds, catalyst, surfactants, blowing agents and optional additives may be introduced separately to the mixing head where they are combined with the polyisocyanate to give the poly-urethane-forming mixture. The mixture may be poured or injected into a suitable container or molded as required. For use of machines with a limited number of component lines into the mixing head, a premix of all the components except the polyisocyanate (and supplementary blowing agent when a gas is used, to give a polyol formulation) can be advantageously employed. This simplifies the metering and mixing of the reacting components at the time the polyurethane-forming mixture is prepared.

Alternatively, the foams may be prepared by the so-called "quasi-prepolymer" method. In this method a portion of the polyol component is reacted in the absence of catalysts with the polyisocyanate component in proportion so as to provide from about 10 percent to about 30 percent of free isocyanate groups in the reaction product based on the prepolymer. To prepare foam, the remaining portion of the polyol is added and the components are allowed to react together in the presence of catalysts and other appropriate additives such as blowing agent, surfactant, etc. Other additives may be added to either the prepolymer or remaining polyol or both prior to the mixing of the components, whereby at the end of the reaction a rigid polyurethane foam is provided.

The polyurethane foam of this invention is useful in a wide range of applications. Accordingly, not only can rigid appliance foam be prepared but the spray insulation rigid insulating board stock, laminates and many other types of rigid foam can easily be prepared with the process of this invention.

The following examples are given to illustrate the invention and are not intended to limit the scope thereof. Unless stated otherwise, all parts and percentages are given by weight.

EXAMPLES 1 TO 15

Rigid polyurethane foams according to the invention are prepared from the formulations described below in Table I. The foams are prepared using a Zaco low pressure machine equipped with a Canon C-7 mixing head fitted with a high shear mixer set to 7,000 rpm. The components are at a temperature 20° C. prior to mixing. The properties of the resulting foams are shown in Table II.

TABLE I

| Ex | $PA^1$ | $PB^2$ | $PC^3$ | $PD^4$ | $PE^5$ | $PF^6$ | $PG^7$ | $SS^8$ | $PM^9$ | $DH^{10}$ | $CA^{11}$ | $W^{12}$ | $R\text{-}11^{13}$ | $MDI^{14}$ | % $CO_2^{15}$ |
|---|---|---|---|---|---|---|---|---|---|---|---|---|---|---|---|
| CE A* | 100 | — | — | — | — | — | — | 1.5 | 0.7 | 3.5 | — | 0.62 | 42.7 | 111 | 10 |
| 1 | 100 | — | — | — | — | — | — | 1.5 | 0.7 | 2.0 | — | 4.7 | 24.0 | 177 | 60 |
| 2 | 100 | — | — | — | — | — | — | 1.5 | 0.7 | 1.5 | — | 3.66 | 18.60 | 156 | 60 |
| 3 | 100 | — | — | — | — | — | — | 1.5 | 0.7 | 1.5 | — | 4.02 | 16.51 | 161.6 | 65 |
| 4 | 100 | — | — | — | — | — | — | 1.5 | 0.7 | 1.5 | — | 4.39 | 14.36 | 167.5 | 70 |
| CE B* | — | 100 | — | — | — | — | — | 1.5 | 0.7 | 3.5 | — | 0.62 | 42.6 | 110 | 10 |
| 5 | — | 100 | — | — | — | — | — | 1.5 | 0.7 | 2.0 | — | 4.7 | 23.9 | 176 | 60 |
| 6 | — | — | 100 | — | — | — | — | 1.5 | 0.7 | 2.0 | — | 4.2 | 21.2 | 144 | 60 |
| 7 | — | — | 100 | — | — | — | — | 1.5 | 0.7 | 2.0 | — | 3.27 | 16.6 | 128.8 | 60 |
| 8 | — | — | 100 | — | — | — | — | 1.5 | 0.7 | 1.5 | — | 3.61 | 14.8 | 134.3 | 65 |
| 9 | — | — | 100 | — | — | — | — | 1.5 | 0.7 | 1.5 | — | 3.94 | 12.8 | 139.7 | 70 |
| 10 | — | — | — | 74.2 | — | 25.8 | — | 1.5 | 0.7 | 2.0 | — | 4.72 | 24.0 | 177 | 60 |
| 11 | — | — | — | 52.4 | — | — | 47.6 | 1.5 | 0.7 | 2.0 | — | 4.18 | 21.2 | 144 | 60 |
| 12 | — | — | — | 45.2 | — | 54.8 | — | 1.5 | 0.7 | 2.0 | — | 4.18 | 21.2 | 144 | 60 |
| 13 | — | — | — | — | 100 | — | — | 1.5 | 0.7 | 2.0 | — | 3.73 | 19.0 | 118 | 60 |
| 14 | — | — | — | — | 100 | — | — | 1.5 | 0.7 | 1.0 | — | 4.6 | 15 | 132 | 70 |
| 15 | — | — | — | — | 100 | — | — | 1.5 | 0.7 | 1.0 | 1.0 | 3.73 | 19.0 | 140 | 60 |

*Comparative Examples A and B are not examples of this invention.
[1]Polyol A, a sorbitol-initiated polyol, propoxylated to an OH No. 390.
[2]Polyol B, a sorbitol-glycerine polyol, average functionality 4, propoxylated to OH No. 380.
[3]Polyol C, a sorbitol-initiated polyol, propoxylated to an OH No. 300.
[4]Polyol D, a sorbitol-initiated polyol, propoxylated to an OH No. 480.
[5]Polyol E, a sorbitol-initiated polyol, propoxylated to an OH No. 226.
[6]Polyol F, a glycerine-initiated polyol, propoxylated to an OH No. 168.
[7]Polyol G, a propylene glycol-initiated polyol, propoxylated to an OH No. 110.
[8]Silicone surfactant is Tegostab B 8427 sold by Th. Goldschmidt.
[9]Pentamethyldiethylenetriamine.
[10]Dimethylcyclohexylamine.
[11]Catalyst A is 33% potassium acetate in dipropylene glycol.
[12]Water.
[13]Refrigerant 11.
[14]A 2.7 functional polymeric MDI. (Index 1.05)
[15]Theoretical mole % $CO_2$ in cell gas.

The height/weight measurements and density distribution data are obtained using a 200×4×6 cm mold preheated to 45° C. The larger the height/weight value the better the flow of the reacting system. The density distribution is a statistical analysis of the foam density obtained when the mold has been overpacked by 10 percent; the lower the value the smaller the deviation in foam density overall.

Post Demold expansion is measured in millimeters in the parallel-to-rise direction on 20×20×20 cm cube foam, molded to an overall density of about 30 kg/m³. The expansion is observed after a curing time of 10 minutes with one face of the mold having been opened after 3 or 4 minutes curing, lower values of expansion indicate improved demold performance. Compressive strengths are measured in the parallel-to-rise and perpendicular-to-rise directions using 5×5×5 cm cubes obtained from the core of the larger molded cubes.

K-factor is measured on foam of an overall density of about 30 kg/m³ cut to approximately 2.5×18×18 cm. K-factor performance is observed in both perpendicular and parallel-to-rise directions. An Anacon Model 88, Thermal Conductivity Analyzer with cold and hot plate temperatures of 10.2 and 37.8° C. was employed.

TABLE II

| Example | c/g/t① (sec) | mcd② (kg/M³) | H/W③ (cm/g) | PDE (mm)④ 3 min | PDE (mm)④ 4 min | K-F (mW/MK)⑤ I | K-F (mW/MK)⑤ II | C St (KPa)⑥ I | C St (KPa)⑥ II |
|---|---|---|---|---|---|---|---|---|---|
| CE A* | 13/80/89 | 25.3 | 1.11 | 12.0 | 13.6 | 17.9 | 20.9 | 56 | 109 |
| 1 | 6/38/54 | 24.0 | 1.37 | 14.7 | 10.5 | 18.7 | 20.1 | 96 | 144 |
| 2 | 6/38/64 | 25.6 | 1.18 | 6.2 | 4.4 | 19.0 | 20.7 | 103 | 153 |
| 3 | 5/33/52 | 25.4 | 1.26 | 6.9 | 5.1 | 20.3 | 21.6 | 103 | 158 |
| 4 | 6/33/55 | 25.1 | 1.20 | 6.3 | 4.6 | 19.8 | 21.3 | 97 | 153 |
| CE B* | 12/83/95 | 24.6 | 1.24 | 17.4 | 13.4 | 18.5 | 21.3 | 44 | 93 |
| 5 | 8/40/61 | 23.3 | 1.39 | 18.0 | 13.7 | 20.4 | 21.0 | 78 | 120 |
| 6 | 7/35/51 | 24.2 | 1.46 | — | 11.9 | 19.2 | 20.6 | 92 | 125 |
| 7 | 6/34/57 | 25.6 | 1.25 | 10.0 | 9.1 | 18.7 | 19.2 | 86 | 128 |
| 8 | 6/38/62 | 24.8 | 1.24 | 8.0 | 7.4 | 20.5 | 22.1 | 86 | 127 |
| 9 | 6/35/60 | 24.4 | 1.26 | 10.4 | 6.6 | 20.8 | 22.1 | 95 | 131 |
| 10 | 6/35/44 | 24.5 | 1.31 | 15.4 | 10.0 | 19.0 | 20.0 | 85 | 125 |
| 11 | 5/35/42 | 24.3 | 1.41 | 16.0 | 12.9 | 19.5 | 20.7 | 56 | 87 |
| 12 | 5/35/46 | 24.1 | 1.43 | 18.9 | 14.9 | 19.7 | 20.5 | 62 | 104 |
| 13 | 6/36/51 | 23.7 | 1.23 | 11.3 | 10.8 | 19.4 | 20.7 | — | — |
| 14 | 7/40/77 | 24.3 | 1.39 | 11.4 | 8.5 | 20.4 | 21.5 | 59 | 85 |
| 15 | 7/42/65 | 23.2 | 1.21 | 7.6 | 6.3 | 19.8 | 20.6 | 65 | 103 |

*Comparative Examples A and B are not examples of this invention.
①Cream/gel/tack free time
②Molded-core density
③Height/weight
④Post demold expansion 3-minite opening time and 4-minite opening time
⑤K-factor (I) perpendicular-to-rise direction and (II) parallel-to-rise direction
⑥Compressive strength (I) perpendicular-to-rise direction and (II) parallel-to-rise direction As can be seen from the data in Table II, good quality foam can be prepared according to the invention. In particular it is to be noted that the height/weight, post demold expansion and compressive strength remain equivalent or are improved when substantial quantities of the hard CFC, refrigerant-11, are substituted by "water" blowing. The K-factor in the parallel-to-rise direction of the examples and comparative foams are largely comparable which is surprising in view of the difference of the average thermal conductivities of the gas mixtures in the closed-cells. At room temperature, refrigerant-11 has a thermal conductivity of about 8.5 mW/MK and carbon dioxide 16.0 mW/MK.

EXAMPLES 16 TO 18

These polyurethane foams are prepared according to the invention formulation details as given in Table III and foam property data in Table IV. These examples illustrate the use of the invention in preparing foams where no hard CFC is used for blowing.

The thermal insulation performance is observed to deteriorate when refrigerant-11 is totally replaced by water for the blowing of the foam, this can be explained on the change of the average theoretical conductivity of the gas composition present within the cells.

As can be seen from the data of Table IV, foams having properties are prepared using a combination of high functionality, high molecular weight polyols and water as blowing agent in accordance with the process of this invention.

TABLE III

| | 16 | 17 | 18 |
|---|---|---|---|
| Polyol H① | 85.5 | / | 45.5 |
| Polyol J② | / | 100 | 55.5 |
| Polyol G③ | 14.5 | / | / |
| Silicon Surfactant④ | 1.5 | 1.5 | 1.5 |
| PMDETA⑤ | 0.4 | 0.1 | 0.1 |
| DMCHA⑥ | 0.9 | 0.4 | 0.4 |
| Water | 5.0 | 6.5 | 6.0 |
| Refrigerant-11 | / | / | / |
| Polymeric MDI⑦ | 148 | 165 | 163 |
| Theoretical mol % $CO_2$ in cell | 100 | 100 | 100 |

①Sucrose-initiated polyol, propoxylated to OH No 260.
②Sucrose-initiated polyol, propoxylated to OH No 204.
③A 500 equivalent weight nominal difunctional poly(propylene) product.
④Tegostab B 8427 sold by Th. Goldschmidt.
⑤Pentamethyldiethylenetriamine.
⑥Dimethylcyclohexylamine.
⑦A 2.7 functional polymeric MDI. (Index 1.05)

TABLE IV

| Foam-Property | 16 | 17 | 18 |
|---|---|---|---|
| cream/gel/tack free time (sec) | 8/35/55 | 15/38/* | 15/71/* |
| Density Kg/M³ | 25.4 | 22.6 | 23.2 |
| Height/Weight (g/cm) | 1.08 | 1.14 | 1.10 |
| Density Distribution | / | 0.88 | 1.05 |
| Post Demould Expansion (mm) 3 minites | 6.95 | 17.5 | 17.1 |
| 4 minites | 5.30 | 12.3 | 10.7 |
| K-Factor (mW/MK) I | 24.4 | 24.1 | 25.6 |
| II | 26.8 | 27.5 | 29.4 |
| Comp St (KPa) I | 75 | 61 | 62 |
| II | 133 | 101 | 113 |

*Not observed.
I: Perpendicular to rise direction.
II: Parallel to rise direction.

What is claimed is:

1. A process for preparing a rigid closed-cell polyisocyanate-based polymer having an average density of from about 6 to about 150 kg/m³, which comprises reacting a polyol composition with an organic polyisocyanate in the presence of catalyst and a blowing agent containing water sufficient to provide from about 50 to about 80 theoretical mole percent carbon dioxide of the total gases present in the cells of the resulting polymer, said polyol composition comprising at least 50 percent by total weight of said polyol composition, a polyol having a hydroxyl number of from about 100 to about 500 and an average functionality of at least four, characterized in that the said polyol is the product of reacting a carbohydrate, or carbohydrate mixture additionally consisting of a member selected from the group consisting of water, glycerine, trimethylolpropane and mixtures thereof, with an alkylene oxide, in that the said polyol composition has an average hydroxyl number of from about 100 to about 500; and in that said polyisocyanate is used in an amount to provide from about 1.0 to about 1.5 isocyanate groups per active hydrogen including those of water present in the reacting system.

2. The process of claim 1 wherein the carbohydrate is one or more selected from the group consisting of lactose, α-methylglucoside, α-hydroxyethylglucoside, hexitol, heptitol, sorbitol, dextrose, mannitol, and sucrose.

3. The process of claim 1 wherein the alkylene oxide is one or more selected from the group consisting of ethylene oxide, propylene oxide, 1,2-butylene oxide, 2,3-butylene oxide, isomers of hexane oxide, and styrene oxide.

4. The process of claim 2 wherein the water provides a cell gas composition with from about 50 to about ζmole percent carbon dioxide.

5. The process of claim 3 wherein said polyol of the polyol composition is present in at least 70 percent by total weight of said polyol composition.

6. The process of claim 2 wherein said polyol of the polyol composition has a hydroxyl number of about 100 to about 400.

7. The process of claim 6 wherein said polyol of the polyol composition has a hydroxyl number of about 140 to about 340.

8. The process of claim 6 wherein said polyol of the polyol composition has an average functionality of about 4 to about 8.

9. The process of claim 6 wherein said polyol of the polyol composition has an average functionality of about 6 to about 8.

10. The process of claim 6 wherein the average hydroxyl number of said polyol composition is from about 100 to about 400.

11. The process of claim 7 wherein the average hydroxyl number of said polyol composition is from about 140 to about 340.

12. The process of claim 1 wherein said organic polyisocyanate comprises diphenylmethane-2,4'-diisocyanate, diphenylmethane-4,4'-diisocyanate, polymethylene polyphenylisocyanate, toluene diisocyanate, or mixtures thereof.

13. The process of claim 12 wherein the organic polyisocyanate is polymethylene polyphenylisocyanate having an average functionality of about 2.05 to about 3.5.

14. A polyisocyanate-based foam prepared according to the process of claim 1.

* * * * *

UNITED STATES PATENT AND TRADEMARK OFFICE
CERTIFICATE OF CORRECTION

PATENT NO. : 4,943,597       Page 1 of 2

DATED : July 24, 1990

INVENTOR(S) : Henri J. M. Grünbauer, Johan A. Thoen and Guido F. Smits

It is certified that error appears in the above-identified patent and that said Letters Patent is hereby corrected as shown below:

On the title page, line 1 of the title, " POLYETHER POLYOL " should correctly read -- NEW POLYETHER POLYOL --.

On the title page, under Inventors, " Henri J. M. Grünbauer, Oostburg, Sweden " should correctly read -- Henri J. M. Grünbauer, Oostburg, Holland--.

On the title page, under Inventors, " Johan A. Thoen, Dommerstraat, Netherlands " should correctly read -- Johan A. Thoen, Dommelstraat, Terneuzen, The Netherlands --.

Column 1, line 1, " POLYETHER POLYOL FORMULATIONS FOR " should correctly read -- NEW POLYETHER POLYOL FORMULATION FOR --.

Column 2, line 46, " 50to " should correctly read -- 50 to --.

Column 2, line 52, the word " cf " should correctly read -- of --.

Column 4, line 7, " and most preferably) " should correctly read -- and most preferably --.

Column 4, line 60, the word " as " should correctly read -- an --.

Column 6, line 57, the word " orgaroferric " should correctly read -- organoferric --.

UNITED STATES PATENT AND TRADEMARK OFFICE
CERTIFICATE OF CORRECTION

Page 2 of 2

PATENT NO. : 4,943,597
DATED : July 24, 1990
INVENTOR(S) : Henri J. M. Grünbauer, Johan A. Thoen and Guido F. Smits It is certified that error appears in the above-identified patent and that said Letters Patent is hereby corrected as shown below:

Column 7, line 17, the word " poly-urethane-forming " should correctly read -- polyurethane-forming --.

Column 11, line 32, " ¿mole percent " should correctly read -- 70 mole percent --.

Column 12, line 1, " claim 3 " should correctly read -- claim 1 --.

Signed and Sealed this

Twenty-sixth Day of May, 1992

Attest:

DOUGLAS B. COMER

*Attesting Officer*  *Acting Commissioner of Patents and Trademarks*